(12) United States Patent
Yamazaki

(10) Patent No.: US 11,413,824 B2
(45) Date of Patent: Aug. 16, 2022

(54) THREE-DIMENSIONAL SHAPING SYSTEM AND DATA GENERATION APPARATUS

(71) Applicant: Seiko Epson Corporation, Tokyo (JP)

(72) Inventor: Satoshi Yamazaki, Matsumoto (JP)

(73) Assignee: Seiko Epson Corporation

( * ) Notice: Subject to any disclaimer, the term of this patent is extended or adjusted under 35 U.S.C. 154(b) by 238 days.

(21) Appl. No.: 16/654,075

(22) Filed: Oct. 16, 2019

(65) Prior Publication Data

US 2020/0122407 A1 Apr. 23, 2020

(30) Foreign Application Priority Data

Oct. 17, 2018 (JP) .............................. JP2018-195677

(51) Int. Cl.
| | |
|---|---|
| *B29C 67/00* | (2017.01) |
| *B29C 64/393* | (2017.01) |
| *B33Y 50/02* | (2015.01) |
| *B33Y 30/00* | (2015.01) |
| *B29C 64/20* | (2017.01) |

(52) U.S. Cl.
CPC ............ *B29C 64/393* (2017.08); *B29C 64/20* (2017.08); *B33Y 30/00* (2014.12); *B33Y 50/02* (2014.12)

(58) Field of Classification Search
CPC ....... B29C 64/20; B29C 64/393; B33Y 10/00; B33Y 30/00; B33Y 50/00; B33Y 50/02
See application file for complete search history.

(56) References Cited

U.S. PATENT DOCUMENTS

| | | | |
|---|---|---|---|
| 2017/0210069 A1 | 7/2017 | Stubenruss | |
| 2017/0252830 A1* | 9/2017 | Sachs | ................. B33Y 50/02 |
| 2017/0291364 A1* | 10/2017 | Womer | ............. B29C 48/501 |

FOREIGN PATENT DOCUMENTS

| | | |
|---|---|---|
| CN | 107498848 A | 12/2017 |
| JP | H03-254912 A | 11/1991 |
| JP | 2003-039563 A | 2/2003 |
| JP | 2005-329719 A | 12/2005 |
| JP | 2006-192710 A | 7/2006 |
| JP | 2007-061880 A | 3/2007 |
| JP | 2009-525207 A | 7/2009 |

(Continued)

*Primary Examiner* — Ryan M Ochylski

(74) *Attorney, Agent, or Firm* — Harness, Dickey & Pierce, P.L.C.

(57) ABSTRACT

A three-dimensional shaping system includes a three-dimensional shaping apparatus and a control apparatus. The control apparatus analyzes path data including a plurality of paths indicating a route along which a nozzle moves relative to a shaping table of the three-dimensional shaping apparatus, and generates shaping data by adding a stop command to the path data in order to temporarily stop change of a relative position and temporarily close an opening and closing mechanism at the time of switching two consecutive paths, when a length of the two consecutive paths or an angle at which the two consecutive paths are connected satisfies a predetermined condition. The control portion of the three-dimensional shaping apparatus shapes a three-dimensional shaping object by controlling the opening and closing mechanism to open and close a flow path of a shaping material connected to the nozzle and a movement mechanism which changes the relative position between the shaping table and the nozzle, according to the shaping data.

6 Claims, 9 Drawing Sheets

(56) References Cited

FOREIGN PATENT DOCUMENTS

| | | |
|---|---|---|
| JP | 2016-531020 A | 10/2016 |
| JP | 2017-523934 A | 8/2017 |
| WO | 2017-152133 A1 | 9/2017 |

\* cited by examiner

THREE-DIMENSIONAL SHAPING SYSTEM AND DATA GENERATION APPARATUS

The present application is based on, and claims priority from, JP Application Serial Number 2018-195677, filed Oct. 17, 2018, the disclosure of which is hereby incorporated by reference herein in its entirety.

BACKGROUND

1. Technical Field

The present disclosure relates to a three-dimensional shaping system and a data generation apparatus.

2. Related Art

JP-A-2006-192710 discloses a technology in which a thermoplastic material heated and melted by a preheater is extruded from an extrusion nozzle which scans in accordance with preset shape data to a specific area on a base and the further-melted material is stacked on the cured material on the base to shape a three-dimensional object.

In a technology described in JP-A-2016-192710, when an extrusion nozzle is moved according to shape data, depending on a location, at which a moving direction of the nozzle switches or the like, such as a corner portion of a shaping object, there may be a case in which shaping precision may be affected because an amount of a material supplied may be excessive, an accurate shaping trajectory cannot be drawn causing the corner portion to be round, or the like.

SUMMARY

An advantage of some aspects of the present disclosure is to improve the shaping precision of a shaping location at which an aspect of movement of the nozzle switches in shaping a three-dimensional shaping object.

According to a first aspect of the present disclosure, there is provided a three-dimensional shaping system including a three-dimensional shaping apparatus and a control apparatus. A method of manufacturing a three-dimensional shaping object is provided. The three-dimensional shaping apparatus includes a shaping table, a nozzle discharging a shaping material toward the shaping table, an opening and closing mechanism opening and closing a flow path of the shaping material connected to the nozzle, a movement mechanism changing a relative position between the shaping table and the nozzle, and a control portion controlling the opening and closing mechanism to close the flow path when the movement mechanism does not change the relative position and controlling the opening and closing mechanism to open the flow path when the movement mechanism changes the relative position. The control apparatus includes a shaping data generation portion which analyzes path data including a plurality of paths indicating a route along which the nozzle moves relative to the shaping table, generates shaping data by adding a stop command to the path data in order to temporarily stop change of the relative position and temporarily close the opening and closing mechanism at the time of switching two consecutive paths, when a length of the two consecutive paths or an angle at which the two consecutive paths are connected satisfies a predetermined condition, and transmits the shaping data to the three-dimensional shaping apparatus. The control portion of the three-dimensional shaping apparatus controls the opening and closing mechanism and the movement mechanism according to the shaping data to shape a three-dimensional shaping object.

According to a second aspect of the present disclosure, a data generation apparatus generating shaping data to be used by a three-dimensional shaping apparatus is provided, the three-dimensional shaping apparatus including a shaping table, a nozzle discharging a shaping material toward the shaping table, an opening and closing mechanism opening and closing a flow path of the shaping material connected to the nozzle, a movement mechanism changing a relative position between the shaping table and the nozzle, and a control portion controlling the opening and closing mechanism to close the flow path when the movement mechanism does not change the relative position and controlling the opening and closing mechanism to open the flow path when the movement mechanism changes the relative position. The data generation apparatus includes a path data acquisition portion acquiring path data including a plurality of paths indicating a route along which the nozzle moves relative to the shaping table, and a shaping data generation portion which analyzes the path data and generates the shaping data for the control portion of the three-dimensional shaping apparatus to control the opening and closing mechanism and the movement mechanism by adding a stop command to the path data in order to temporarily stop change of the relative position and temporarily close the opening and closing mechanism at the time of switching two consecutive paths, when a length of the two consecutive paths or an angle at which the two consecutive paths are connected satisfies a predetermined condition.

DESCRIPTION OF EXEMPLARY EMBODIMENTS

A. First Embodiment

Figure 1:
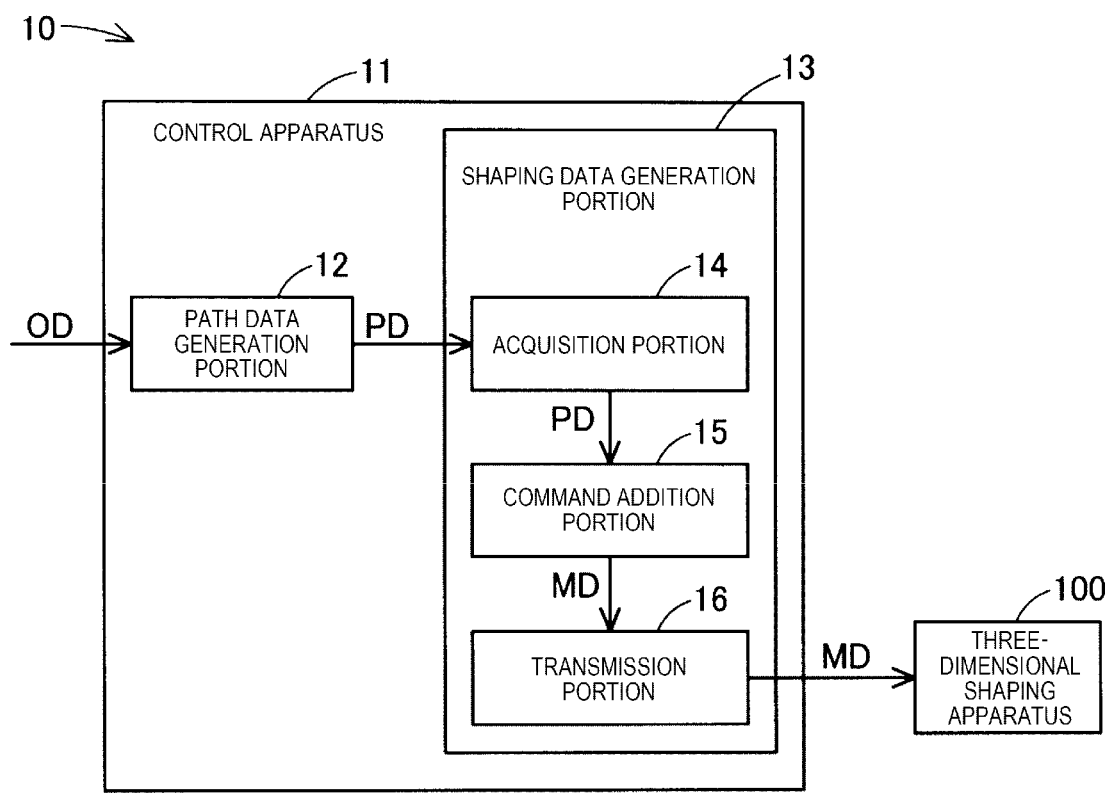
FIG. 1 is a schematic block diagram showing a configuration of a three-dimensional shaping system.

FIG. 1 is a schematic block diagram showing a configuration of a three-dimensional shaping system 10 in the present embodiment. The three-dimensional shaping system 10 includes a three-dimensional shaping apparatus 100. The three-dimensional shaping system 10 causes the three-dimensional shaping apparatus 100 to shape a three-dimensional shaping object based on original data OD representing a shape of the three-dimensional shaping object. In the present embodiment, the original data OD is three-dimensional computer-aided design (CAD) data created by three-dimensional computer-aided design software.

The three-dimensional shaping system 10 further includes a control apparatus 11. The control apparatus 11 is constituted with a computer including one or a plurality of processors and a main storage apparatus. The control apparatus 11 performs various functions by a processor executing a program and an instruction read on the main storage apparatus. Further, in another embodiment, the control apparatus 11 may be realized by a configuration in which a plurality of circuits for realizing each function are combined instead of being constituted with the computer.

The control apparatus 11 generates shaping data MD used for three-dimensional shaping processing in the three-dimensional shaping apparatus 100 from the original data OD. The control apparatus 11 includes a path data generation portion 12 and a shaping data generation portion 13. In the present embodiment, the path data generation portion 12 and the shaping data generation portion 13 are functional units which are realized by a program which is executed by a computer constituting the control apparatus 11. The control apparatus 11 can also be referred to as a data generation apparatus.

The path data generation portion 12 has a function of receiving input of the original data OD from an outside of the control apparatus 11 and generating path data PD from the original data OD. The path data generation portion 12 outputs the generated path data PD to the shaping data generation portion 13. The path data PD includes a plurality of paths indicating a route along which a nozzle 61 moves relative to a shaping table 210. Details of the path data PD will be described after describing a configuration of the three-dimensional shaping apparatus 100.

The shaping data generation portion 13 performs data generation processing which generates the shaping data MD from the path data PD. The shaping data generation portion 13 has an acquisition portion 14, a command addition portion 15, and a transmission portion 16. The acquisition portion 14 acquires the path data PD from the path data generation portion 12. The acquisition portion 14 outputs the path data PD to the command addition portion 15.

The command addition portion 15 analyzes contents of the path data PD. The command addition portion 15 adds a stop command to the path data PD based on an analysis result to generate the shaping data MD. The transmission portion 16 transmits the generated shaping data MD to the three-dimensional shaping apparatus 100. Details of the data generation processing, the analysis of the path data PD by the command addition portion 15, the stop command added by the command addition portion 15, and the shaping data MD will be described later.

Figure 2:
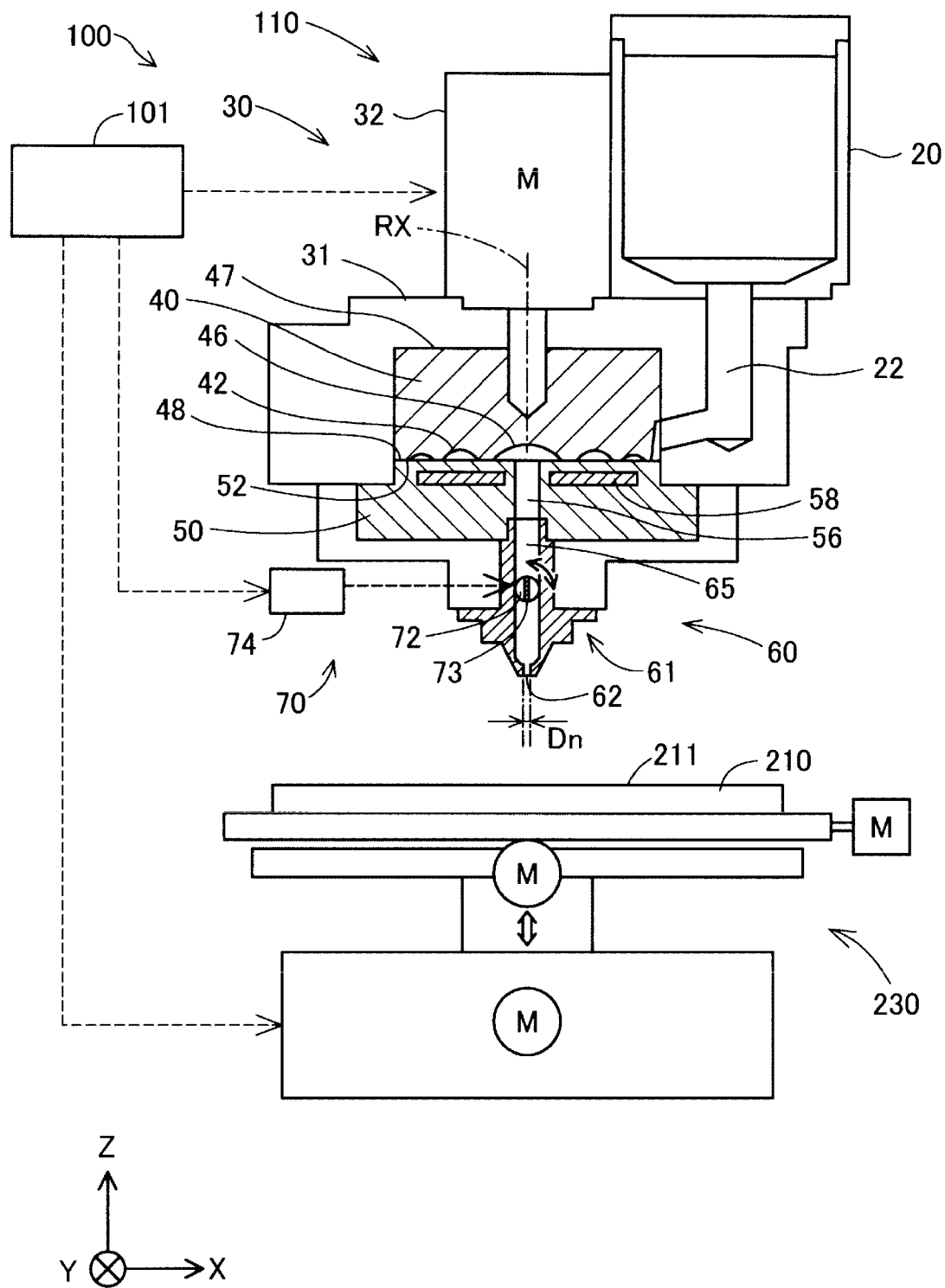
FIG. 2 is a schematic view showing a configuration of a three-dimensional shaping apparatus.

FIG. 2 is a schematic view showing a configuration of the three-dimensional shaping apparatus 100. In FIG. 2, arrows indicating X, Y, and Z directions orthogonal to one another are shown. In the present embodiment, the X direction and the Y direction are directions parallel to a horizontal plane, and the Z direction is a direction opposite to the gravity direction. The arrows indicating the X, Y, and Z directions are also shown appropriately in other reference figures so that the shown directions correspond to FIG. 2.

The three-dimensional shaping apparatus 100 shapes the three-dimensional shaping object using a shaping material. The "shaping material" will be described later. The three-dimensional shaping apparatus 100 includes a control portion 101, a shaping portion 110, the shaping table 210, and a movement mechanism 230.

The control portion 101 controls the entire three-dimensional shaping apparatus 100 such as an opening and closing mechanism 70 and the movement mechanism 230, in accordance with the shaping data MD received from the control apparatus 11, to perform shaping processing which shapes the three-dimensional shaping object. In the present embodiment, the control portion 101 is constituted with a computer including one or the plurality of processors and the main storage apparatus. The control portion 101 performs various functions by the processor executing a program and an instruction read on the main storage apparatus. Further, the control portion 101 may be realized by a configuration in which a plurality of circuits for realizing each function are combined instead of being constituted with the computer.

The shaping portion 110 melts at least a part of a solid state material to dispose the paste-like shaping material on the shaping table 210. The shaping portion 110 includes a material supply portion 20, a shaping material generation portion 30, and a discharge portion 60.

The material supply portion 20 supplies the material to the shaping material generation portion 30. The material supply portion 20 is constituted with, for example, a hopper which accommodates the material. The material supply portion 20 has a discharge port in a downward direction. The discharge port is connected to the shaping material generation portion 30 via a communication passage 22. The material is introduced into the material supply portion 20 in a form of a pellet or powder, or the like. The material to be introduced to the material supply portion 20 will be described later.

The shaping material generation portion 30 generates the paste-like shaping material exhibiting fluidity by melting at least a portion of the material supplied from the material supply portion 20, and guides the shaping material to the discharge portion 60. The shaping material generation portion 30 has a screw case 31, a drive motor 32, a flat screw 40, and a screw facing portion 50.

The flat screw 40 has a substantially cylindrical shape whose height along a central axis is smaller than a diameter thereof. The flat screw 40 is disposed such that the central axis is parallel to the Z direction. In the present embodiment, the central axis of the flat screw 40 coincides with an axis of rotation RX thereof. In FIG. 2, the axis of rotation RX of the flat screw 40 is illustrated by an alternate long and short dash line.

The flat screw 40 is housed in a screw case 31. An upper surface 47 side of the flat screw 40 is connected to the drive motor 32, and the flat screw 40 rotates in the screw case 31 by a rotational drive force generated by the drive motor 32. The drive motor 32 is driven under control of the control portion 101.

In the flat screw 40, a groove portion 42 is formed on a lower surface 48 which is a surface intersecting with the axis of rotation RX. The communication passage 22 of the material supply portion 20 described above communicates with the groove portion 42 from a side surface of the flat screw 40.

The lower surface 48 of the flat screw 40 faces an upper surface 52 of the screw facing portion 50, and space is formed between the groove portion 42 of the lower surface 48 of the flat screw 40 and the upper surface 52 of the screw facing portion 50. In the shaping portion 110, the material is supplied from the material supply portion 20 to the space between the flat screw 40 and the screw facing portion 50.

Specific configurations of the flat screw 40 and the groove portion 42 will be described later.

In the screw facing portion 50, a heater 58 for heating the material is embedded. The material supplied into the groove portion 42 of the rotating flat screw 40 flows along the groove portion 42 while being at least partially melted by a rotation of the flat screw 40 and is guided to a center portion 46 of the flat screw 40. The paste-like material as the shaping material flowing into the center portion 46 is supplied to the discharge portion 60 through a communication hole 56 provided at a center of the screw facing portion 50.

The discharge portion 60 has the nozzle 61, a flow path 65, and an opening and closing mechanism 70. The nozzle 61 is connected to the communication hole 56 of the screw facing portion 50 through the flow path 65. The flow path 65 is a flow path of the shaping material between the flat screw 40 and the nozzle 61. The nozzle 61 discharges the shaping material generated in the shaping material generation portion 30 from a discharge port 62 at a tip thereof toward the shaping table 210.

The discharge port 62 of the nozzle 61 has a hole diameter Dn. The hole diameter Dn of the nozzle 61 is a maximum value of an opening width of the discharge port 62 in a scanning direction of the nozzle 61. The "scanning direction of the nozzle 61" is a direction in which a position of the nozzle 61 moves relative to the shaping table 210 while the nozzle 61 discharges the shaping material. In the present embodiment, the discharge port 62 has a shape of a perfect circular shape, and the hole diameter Dn corresponds to the diameter of the discharge port 62. The discharge port 62 may have a shape other than the perfect circular shape. In that case, the hole diameter Dn corresponds to a distance between end portions of the discharge port 62 located farthest in the scanning direction. When the discharge port 62 has a configuration in which a plurality of minute openings are disposed, the hole diameter Dn corresponds to a distance between outer end portions of the two minute openings disposed outermost in the scanning direction.

The opening and closing mechanism 70 controls flow of the shaping material from the nozzle 61 by opening and closing the flow path 65. In the present embodiment, the opening and closing mechanism 70 is constituted with a butterfly valve. The opening and closing mechanism 70 includes a drive shaft 72, a valve body 73, and a valve drive portion 74.

The drive shaft 72 is a shaft-like member extending in one direction. The drive shaft 72 is attached at the flow path 65 so as to cross a flow direction of the shaping material. In the present embodiment, the drive shaft 72 is attached perpendicularly to the flow path 65. FIG. 2 shows a configuration in which the drive shaft 72 is disposed in parallel to the Y direction. The drive shaft 72 is rotatably attached about a central axis thereof.

The valve body 73 is a plate-like member which rotates in the flow path 65. In the present embodiment, the valve body 73 is formed by processing a portion of the drive shaft 72 disposed in the flow path 65 into a plate shape. The shape when the valve body 73 is viewed in a direction perpendicular to a plate surface thereof substantially matches an opening shape of the flow path 65 at a portion in which the valve body 73 is disposed.

The valve drive portion 74 generates a rotational drive force rotating the drive shaft 72 under the control of the control portion 101. The valve drive portion 74 is constituted with, for example, a stepping motor. Rotation of the drive shaft 72 causes the valve body 73 to rotate in the flow path 65.

A state in which a plate surface of the valve body 73 follows along the flow direction of the shaping material in the flow path 65, as shown in FIG. 2, is the state in which the flow path 65 is open. In the state, an inflow of shaping material from the flow path 65 to the nozzle 61 is allowed, and the shaping material flows out of the discharge port 62. A state in which the plate surface of the valve body 73 is perpendicular to the flow direction of the shaping material in the flow path 65 is the state in which the flow path 65 is closed. In the state, the inflow of the shaping material from the flow path 65 to the nozzle 61 is shut off, and an outflow of the shaping material from the discharge port 62 is stopped.

The shaping table 210 is disposed at a position facing the discharge port 62 of the nozzle 61. The shaping table 210 has an upper surface 211 disposed parallel to the X and Y directions. As described later, in the three-dimensional shaping apparatus 100, the three-dimensional shaping object is shaped by stacking the shaping material on the upper surface 211 of the shaping table 210.

The movement mechanism 230 changes relative positional relationship between the nozzle 61 and the shaping table 210 under the control of the control portion 101. The movement mechanism 230 is constituted with a three-axis positioner, and changes the relative position between the nozzle 61 and the shaping table 210 in three axial directions of the X, Y, and Z directions by drive force of three motors. In the present embodiment, the movement mechanism 230 moves the shaping table 210 with respect to the nozzle 61 whose position is fixed.

In the three-dimensional shaping apparatus 100, a configuration may be adopted in which instead of moving the shaping table 210 by the movement mechanism 230, the movement mechanism 230 moves the nozzle 61 relative to the shaping table 210 with a position of the shaping table 210 fixed. Further, a configuration in which the shaping table 210 is moved in the Z direction by movement mechanism 230 and the nozzle 61 is moved in the X and Y directions, or a configuration in which the shaping table 210 is moved in the X and Y directions by the movement mechanism 230 and the nozzle 61 is moved in the Z direction, may be adopted. Even in these configurations, the relative positional relationship between the nozzle 61 and the shaping table 210 can be changed.

In the following, the "movement of the nozzle 61" means change in the relative position of the nozzle 61 with respect to the shaping table 210 unless otherwise specified. Further, when saying a "movement speed of the nozzle 61", it means a relative speed of the nozzle 61 with respect to the shaping table 210, and when saying a "movement distance of the nozzle 61", it means a change amount of the nozzle 61 with respect to the shaping table 210.

The control portion 101 of the embodiment controls the opening and closing mechanism 70 to close the flow path 65 when the movement mechanism 230 does not change the position of the nozzle 61, and controls the opening and closing mechanism 70 to open the flow path 65 when the movement mechanism 230 changes the position of the nozzle 61. Therefore, in the three-dimensional shaping apparatus 100, the shaping material is discharged from the nozzle 61 when the nozzle 61 is moving, and the shaping material is not discharged from the nozzle 61 when the nozzle 61 is stopped. Such control is performed by the control portion 101 controlling the opening and closing mechanism 70 and the movement mechanism 230 in accordance with the shaping data MD acquired from the control apparatus 11.

Figure 3:
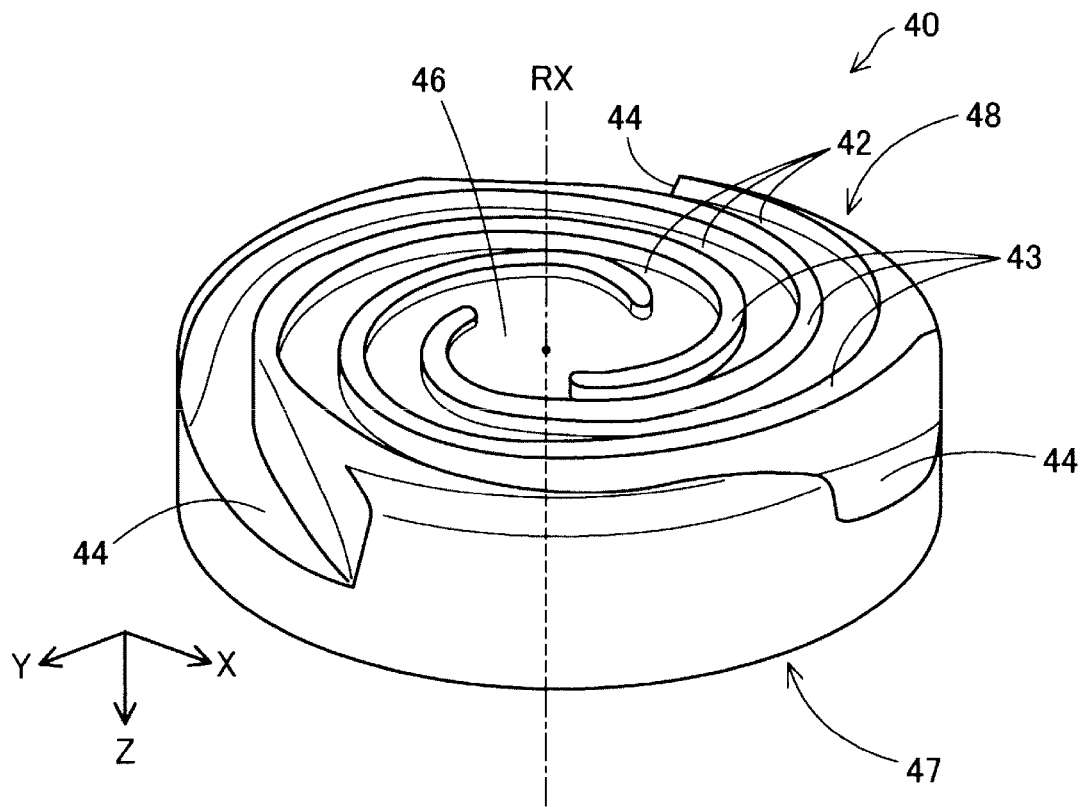
FIG. 3 is a schematic perspective view of a flat screw.

FIG. 3 is a schematic perspective view showing a configuration of the lower surface 48 side of the flat screw 40. In FIG. 3, a position of the axis of rotation RX of the flat screw 40 is illustrated by an alternate long and short dash line. As described with reference to FIG. 2, a groove portion 42 is provided on the lower surface 48 of the flat screw 40 facing the screw facing portion 50. Hereinafter, the lower surface 48 is also referred to as the "groove formation surface 48".

The center portion 46 of the groove formation surface 48 of the flat screw 40 is constituted with a recess to which one end of the groove portion 42 is connected. The center portion 46 faces the communication hole 56 of the screw facing portion 50 as shown in FIG. 2. The center portion 46 intersects with the axis of rotation RX.

The groove portion 42 of the flat screw 40 constitutes a so-called scroll groove. The groove portion 42 extends in a spiral shape so as to draw an arc from the center portion 46 to an outer circumference of the flat screw 40. The groove portion 42 may be configured to extend helically. The groove formation surface 48 is provided with a projection strip portion 43 which constitutes a side wall portion of the groove portion 42 and extends along each groove portion 42.

The groove portion 42 is continuous to a material inlet 44 formed on a side of the flat screw 40. The material inlet 44 is a part which receives the material supplied via the communication passage 22 of the material supply portion 20.

As the flat screw 40 rotates, at least a portion of the material supplied from the material inlet 44 melts while being heated in the groove portion 42, and fluidity thereof increases. Then, the material flows to the center portion 46 through the groove portion 42, gathers in the center portion 46, is guided to the nozzle 61 by an internal pressure generated in the center portion 46, and is discharged from the discharge port 62.

An example of a flat screw 40 having the three groove portions 42 and the three projection strip portions 43 is shown in FIG. 3. The number of the groove portions 42 and the projection strip portions 43 provided in the flat screw 40 is not limited to three. Only the one groove portion 42 may be provided in the flat screw 40, or the two or more groove portions 42 may be provided. Further, an arbitrary number of the projection strip portions 43 may be provided in accordance with the number of the groove portions 42.

An example of the flat screw 40 in which the material inlet 44 is formed at three places is shown in FIG. 3. The number of the material inlets 44 provided in the flat screw 40 is not limited to three. In the flat screw 40, the material inlet 44 may be provided at only one place, or may be provided at a plurality of places such as two or more places.

Figure 4:
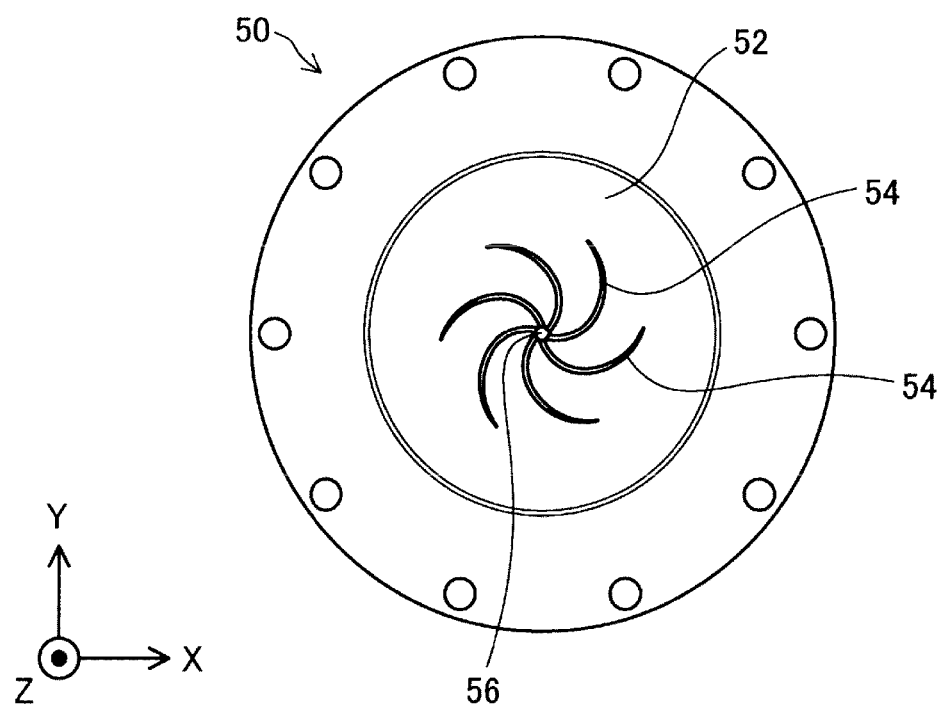
FIG. 4 is a schematic plan view of a screw facing portion.

FIG. 4 is a schematic plan view showing the upper surface 52 side of the screw facing portion 50. The upper surface 52 of the screw facing portion 50 faces the groove formation surface 48 of the flat screw 40 as described above. Hereinafter, the upper surface 52 is also referred to as the "screw facing surface 52". At a center of the screw facing surface 52, the communication hole 56 described above for supplying the shaping material to the nozzle 61 is formed.

In the screw facing surface 52, a plurality of the guide grooves 54 which are connected to the communication hole 56 and spirally extending from the communication hole 56 toward an outer circumference of the screw facing surface 52, are formed. The plurality of guide grooves 54 have a function of guiding the shaping material to the communication hole 56. As described with reference to FIG. 2, in the screw facing portion 50, the heater 58 for heating the material is embedded. Melting of the material in the shaping material generation portion 30 is realized by heating by the heater 58 and the rotation of the flat screw 40.

Please refer to FIG. 2. In the shaping portion 110, by using the flat screw 40 having a small size in the Z direction, a range occupied by a path for melting at least a portion of the material and guiding the material to the nozzle 61 is reduced in the Z direction. In this manner, in the three-dimensional shaping apparatus 100, generation mechanism of the shaping material is miniaturized by using the flat screw 40.

In the three-dimensional shaping apparatus 100, a configuration which pressure-feeds the shaping material made into a state having fluidity to the nozzle 61 is easily realized by using the flat screw 40. According to the configuration, control of discharge amount of the shaping material from the nozzle 61 is possible by control of a rotation speed of the flat screw 40, and the discharge control of the shaping material from the nozzle 61 is facilitated. The "discharge amount of the shaping material from the nozzle 61" means a flow rate of the shaping material flowing out from the discharge port 62 of the nozzle 61.

In the three-dimensional shaping apparatus 100, by having a generation mechanism of the shaping material using the flat screw 40, the shaping material developing fluidity is guided to the nozzle 61 through the flow path 65. Therefore, the discharge control of the shaping material by the opening and closing mechanism 70 of a simple configuration provided downstream of the flow path 65 is enabled, and precision of the discharge control of the shaping material is increased.

Figure 5:
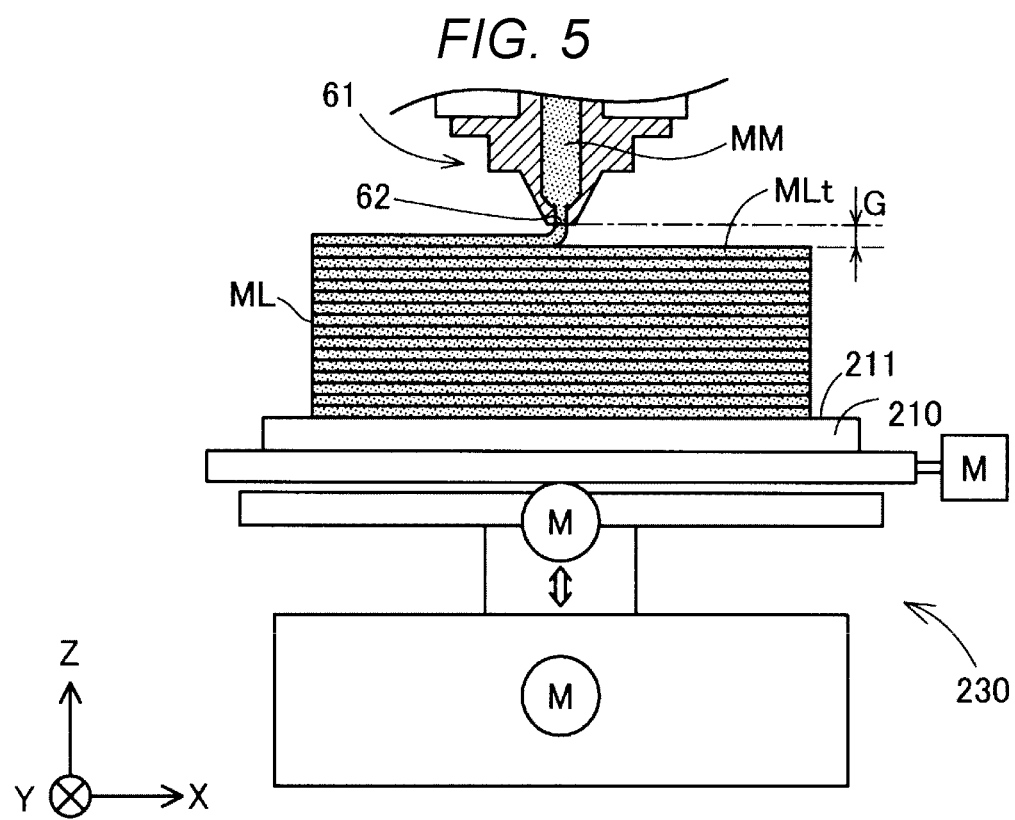
FIG. 5 is a schematic view schematically showing an aspect of how a three-dimensional shaping object is shaped.

FIG. 5 is a schematic view schematically showing how the three-dimensional shaping apparatus 100 shapes the three-dimensional shaping object by discharge processing. In the three-dimensional shaping apparatus 100, when shaping the three-dimensional shaping object, the following discharge processing is performed under the control of the control portion 101.

In the discharge processing, as described above, at least a portion of the solid state material supplied to the rotating flat screw 40 is melted to generate a shaping material MM, in the shaping material generation portion 30. Then, while the nozzle 61 is moved in the scanning direction along the upper surface 211 of the shaping table 210 by the movement mechanism 230, the shaping material MM is discharged from the nozzle 61 toward the upper surface 211 of the shaping table 210. In the discharge processing, the shaping material MM discharged from the nozzle 61 is continuously stacked in the scanning direction of the nozzle 61.

Here, a layer formed of the shaping material MM discharged by the discharge processing when the nozzle 61 is at a same height position with respect to the upper surface 211 of the shaping table 210 is referred to as a "shaping layer ML". The control portion 101 shapes the three-dimensional shaping object by moving the position of the nozzle 61 in the Z direction and further stacking the shaping material MM by the next discharge processing on the shaping layer ML formed by the previous discharge processing. That is, in the three-dimensional shaping apparatus 100, the three-dimensional shaping object is shaped by stacking of the shaping layer ML. The control portion 101 shapes the three-dimensional shaping object on the shaping table 210 by controlling the movement of the nozzle 61 and the discharge of the shaping material MM from the nozzle 61 in accordance with control contents of the nozzle 61 represented by the shaping data MD described later.

On the other hand, when forming the shaping layer ML, it is desirable that a following gap G is maintained between the discharge port 62 at the tip of the nozzle 61 and a planned portion MLt on which the shaping material MM discharged from nozzle 61 is to be stacked at a vicinity of a position immediately below the nozzle 61. When the shaping material MM is discharged on the shaping layer ML, the planned portion MLt, on which the shaping material MM is to be discharged, is an upper surface of the shaping layer ML located below the nozzle 61.

It is preferable that a size of the gap G is equal to or greater than the hole diameter Dn at the discharge port 62 of the nozzle 61, and more preferably equal to or greater than 1.1 times the hole diameter Dn. In this way, the shaping material MM discharged from the discharge port 62 of the nozzle 61 is stacked in a free state in which the shaping material MM is not pressed against the planned portion MLt. As a result, a cross-sectional shape of the shaping material MM discharged from the nozzle 61 can be suppressed from being broken, and surface roughness of the three-dimensional shaping object can be reduced. Further, in a configuration in which the heater is provided around the nozzle 61, overheating of the shaping material MM by the heater can be prevented by forming the gap G, and discoloration and deterioration by the overheating of the shaping material MM after stacking can be suppressed. On the other hand, it is preferable that the size of the gap G is 1.5 times or less than the hole diameter Dn, and particularly preferable that the size is 1.3 times or less. As a result, positional deviation of the discharge position of the shaping material MM with respect to the planned portion MLt and a decrease in adhesion between the shaping layers ML are suppressed.

The material used in the three-dimensional shaping apparatus 100 will be described. In the three-dimensional shaping apparatus 100, the three-dimensional shaping object can be shaped, for example, with various materials such as a material having thermoplasticity, a metal material, and a ceramic material as a main material. Here, the "main material" means a central material which forms a shape of the three-dimensional shaping object, and means a material which accounts for a content of 50% by weight or more in the three-dimensional shaping object. The shaping material MM described above includes one in which the main material is melted alone, and one in which a part of the components contained together with the main material is melted and made into a paste.

When a material having thermoplasticity is used as the main material, the shaping material MM is generated in the shaping material generation portion 30 by plasticizing the material. A "plasticization" means that heat is applied to the material having thermoplasticity to melt the material.

As the material having thermoplasticity, for example, the following thermoplastic resin material can be used.
Examples of Thermoplastic Resin Materials General purpose engineering plastics such as polypropylene resin (PP), polyethylene resin (PE), polyacetal resin (POM), polyvinyl chloride resin (PVC), polyamide resin (PA), acrylonitrile butadiene styrene resin (ABS), polylactic acid resin (PLA), polyphenylene sulfide resin (PPS), polyetheretherketone (PEEK), polycarbonate (PC), modified polyphenylene ether, polybutylene terephthalate, and polyethylene terephthalate, or engineering plastics such as polysulfone, polyether sulfone, polyphenylene sulfide, polyarylate, polyimide, polyamide imide, polyether imide, and polyether ether ketone In the material having thermoplasticity, additives such as a wax, a flame retardant, an antioxidant, and a heat stabilizer may be mixed with a pigment, a metal, a ceramic, or the like. The material having thermoplasticity is plasticized and converted to a melted state by the rotation of the flat screw 40 and the heating of the heater 58 in the shaping material generation portion 30. Further, the shaping material MM generated by such a method above is discharged from the nozzle 61 and then cured by a decrease in temperature.

It is desirable that the material having thermoplasticity is ejected from the nozzle 61 in a completely melted state by being heated to a temperature higher than or equal to a glass transition point thereof. For example, it is desirable that the ABS resin which has a glass transition point of about 120° C. is at about 200° C. when ejected from the nozzle 61. A heater may be provided around the nozzle 61 in order to eject the shaping material MM in such a high temperature state.

In the three-dimensional shaping apparatus 100, for example, the following metal material may be used as the main material instead of the material having thermoplasticity described above. In this case, it is desirable that components to be melted during the generation of the shaping material MM is mixed with the powder material made of the following metal material and the mixture is introduced into the shaping material generation portion 30.
Examples of Metal Materials A single metal of magnesium (Mg), iron (Fe), cobalt (Co), chromium (Cr), aluminum (Al), titanium (Ti), copper (Cu), and nickel (Ni), or an alloy containing one or more of these metals
Examples of the Alloys Described Above Maraging steel, stainless steel, cobalt chromium molybdenum, titanium alloy, nickel alloy, aluminum alloy, cobalt alloy, and cobalt chromium alloy In the three-dimensional shaping apparatus 100, it is possible to use a ceramic material as the main material instead of the metal material described above. As the ceramic material, for example, oxide ceramics such as silicon dioxide, titanium dioxide, aluminum oxide and zirconium oxide, and non-oxide ceramics such as aluminum nitride can be used. When the metal material or the ceramic material as described above is used as the main material, the shaping material MM disposed in the shaping table 210 may be cured by sintering.

The powder material of the metal material or the ceramic material introduced to the material supply portion 20 may be a single metal powder and an alloy powder, or a mixed material produced by mixing a plurality of types of ceramic material powders. Further, the powder material of the metal material or the ceramic material may be coated with, for example, a thermoplastic resin as exemplified above, or other thermoplastic resins. In this case, the thermoplastic resin may be melted to develop fluidity in the shaping material generation portion 30.

For example, the following solvent may be added to the powder material of the metal material or the ceramic material which are introduced to the material supply portion 20. The solvent can be used by combining 1 type, or 2 or more types selected from the following.
Examples of Solvent Water, (poly) alkylene glycol monoalkyl ethers such as ethylene glycol monomethyl ether, ethylene glycol monoethyl ether, propylene glycol monomethyl ether, and propylene glycol monoethyl ether, acetate esters such as ethyl acetate, n-propyl acetate, iso-propyl acetate, n-butyl acetate, and iso-butyl acetate, aromatic hydrocarbons such as benzene, toluene and xylene, ketones such as methyl ethyl ketone, acetone, methyl isobutyl ketone, ethyl n-butyl ketone, diisopropyl ketone and acetylacetone, alcohols such as ethanol, propanol and butanol, tetraalkyl ammonium acetates, sulfoxide solvents such as dimethyl sulfoxide and diethyl sulfoxide, pyridine solvents such as pyridine, γ-picoline and 2,6-lutidine, and ionic liquids such as tetraalkyl ammonium acetate (for example, tetrabutyl ammonium acetate or the like) and butyl carbitol acetate In addition, for example, the following binder may be added to the powder material of the metal material or the ceramic material introduced into the material supply portion 20.

Examples of Binders

Figure 6:
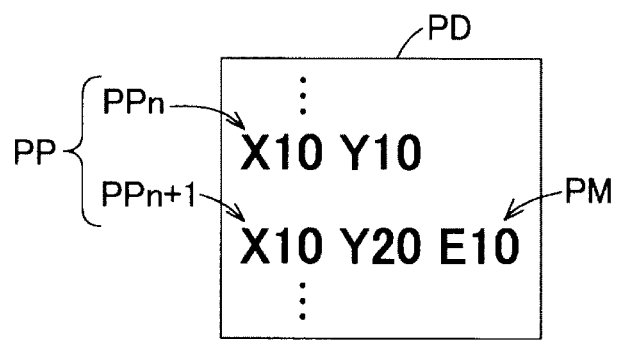
FIG. 6 is a schematic diagram showing an example of path data.

Acrylic resin, epoxy resin, silicone resin, cellulose resin or other synthetic resin, or PLA (polylactic acid), PA (polylamide), PPS (polyphenylene sulfide), PEEK (polyether ether ketone) or other thermoplastic resin FIG. 6 is a schematic diagram showing an example of the path data PD generated by the path data generation portion 12 of the control apparatus 11 in the three-dimensional shaping system 10. The information described in path data PD is read and interpreted in order from the top to the bottom as illustrated in FIG. 6. The path data PD includes a parameter specifying the control contents of the nozzle 61 for the three-dimensional shaping apparatus 100 to shape the three-dimensional shaping object represented by the original data OD. Here, the "control contents of the nozzle 61" include control of the movement of the nozzle 61 with respect to the shaping table 210 and control of the discharge of the shaping material MM from the nozzle 61. In the path data PD of the present embodiment, the control of the movement of the nozzle 61 is indicated by a path parameter PP. Further, the control of the discharge of the shaping material MM from the nozzle 61 is indicated by a discharge parameter PM.

The path parameter PP specifies coordinates (X, Y) of a coordinate system having the X and Y directions on the upper surface 211 of the shaping table 210 at which the nozzle 61 should be positioned next as coordinate axis. In the path Data PD, one path is specified by a set of two path parameters $PP_n$, $PP_{n+1}$ lined up as previous and subsequent parameters. The subscript "n" is an arbitrary natural number. The "path" is a unit of the movement path of the nozzle 61, and means a route of a section when the movement of the nozzle 61 during shaping the shaping layer ML is divided by linear movement in one direction from arbitrary coordinates to the next coordinates.

In the example of FIG. 6, a path is specified in which the nozzle 61 moves in the Y direction by a predetermined unit distance of +10 from the coordinates (10, 10) to the coordinates (10, 20) by the set of two path parameters $PP_n$ and $PP_{n+1}$. In this manner, the path data PD is interpreted as including the path indicating the movement direction and the movement distance of the nozzle 61.

The discharge parameter PM is attached after the path parameter PP. The discharge parameter PM specifies the amount of the shaping material MM to be discharged during a time when the nozzle 61 moves to the coordinates shown by the path parameter PP. That is, the discharge parameter PM represents the total amount of the shaping material MM disposed on the shaping table 210 corresponding to the movement of the nozzle 61 represented by the path included in the path data PD.

In the example of FIG. 6, an integer value showing the amount of the shaping material MM represented in a predetermined unit amount is attached after an alphabet "E" indicating that the value is the discharge parameter PM. In the example, during a time when the nozzle 61 is moved from the coordinates (10, 10) to the coordinates (10, 20), it is specified to discharge the shaping material MM of 10 unit amounts.

Figure 7:
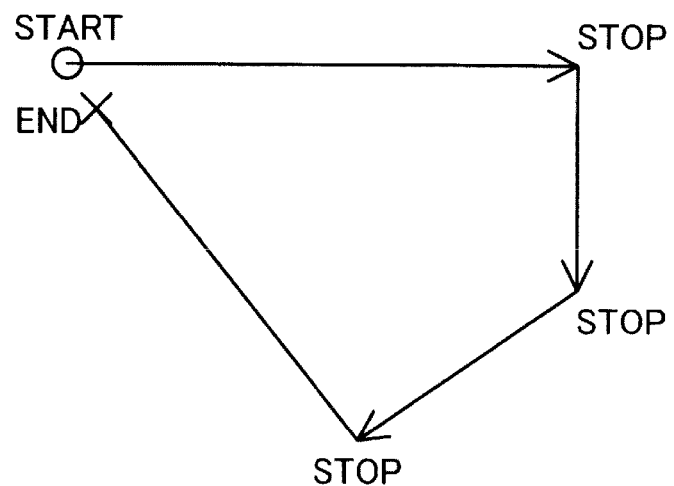
FIG. 7 is a diagram showing an example of a path representing a movement route of a nozzle.

FIG. 7 is a diagram showing an example of a path representing the movement path of the nozzle 61. In the present embodiment, when at least one of a length of two consecutive paths and an angle at which the two consecutive paths are connected satisfies a predetermined condition, the control portion 101 temporarily stops the change of the relative position between the nozzle 61 and the shaping table 210, that is, the movement of the nozzle 61 and temporarily closes the opening and closing mechanism 70 at the time of switching two consecutive paths. Operation for temporarily stopping the movement of the nozzle 61 and temporarily closing the opening and closing mechanism 70 is controlled by the stop command included in the shaping data MD described later.

The path data PD is data configured to be also used to shape the three-dimensional shaping object in a shaping apparatus of a type which does not have a configuration that controls the discharge of the shaping material MM by the valve such as the opening and closing mechanism 70 similar to the three-dimensional shaping apparatus 100 of the embodiment. In the present embodiment, the path data PD has the same data type as data inputted to a 3D printer with the so-called heat fused deposition method, that is, the FDM method. The path data generation portion 12 may generate the path data PD using software in related art which is referred to as the so-called slicer developed for the 3D printer with the FDM method. In the three-dimensional shaping system 10 of the present embodiment, the data generation processing described below generates the shaping data MD conforming to the three-dimensional shaping apparatus 100 to which the opening and closing mechanism 70 is added based on the path data PD.

Figure 8:
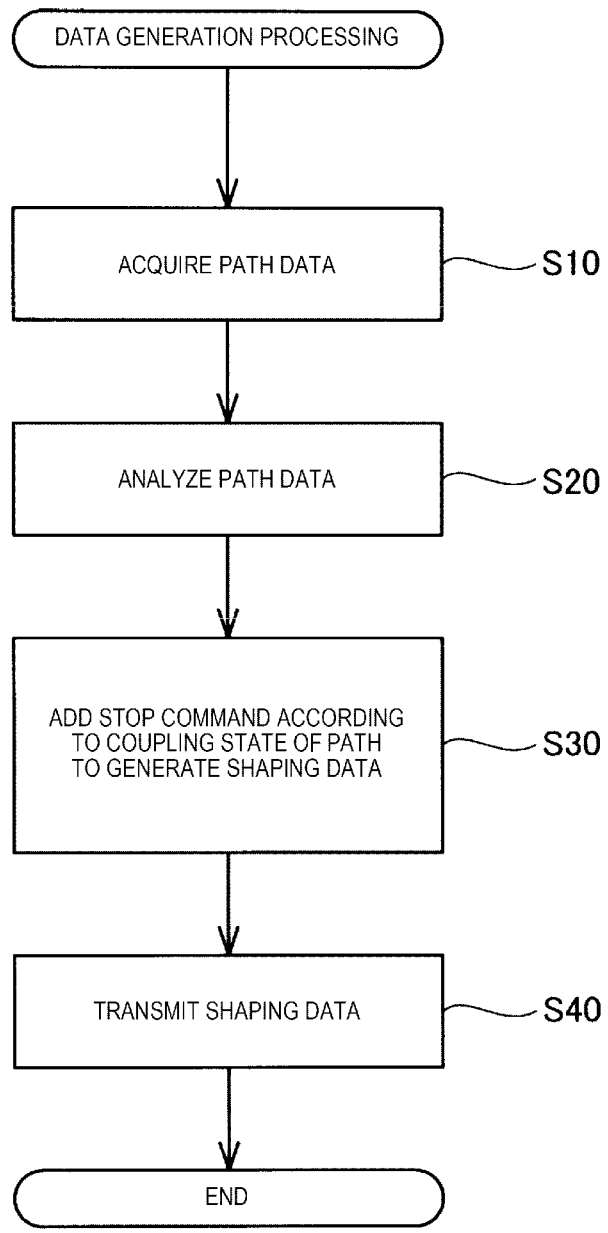
FIG. 8 is a flowchart of data generation processing.

FIG. 8 is a flowchart of the data generation processing performed in the shaping data generation portion 13. The data generation processing is processing of adding the stop command to the path data PD according to the consecutive paths shown by the path parameter PP in the path data PD to generate the shaping data MD. The data generation processing is performed for each path data PD corresponding to each shaping layer ML.

In a step S10, the acquisition portion 14 of the shaping data generation portion 13 acquires the path data PD generated by the path data generation portion 12. The acquisition portion 14 outputs the path data PD to the command addition portion 15.

In a step S20, the command addition portion 15 analyzes the contents of the path data PD including a plurality of the paths. The command addition portion 15 analyzes the path data PD and specifies the control contents of the nozzle 61 described in the path data PD as follows.

Please refer to FIG. 6. The command addition portion 15 specifies a path along which the nozzle 61 moves while discharging the shaping material MM based on the path parameter PP and the discharge parameter PM of the path data PD. Hereinafter, the "path along which the nozzle 61 moves while discharging the shaping material MM" is also simply referred to as the "path".

The command addition portion 15 specifies the movement distance and the movement speed of the nozzle 61 in each path as the control contents of the nozzle 61. The movement distance of the nozzle 61 of each path is calculated from coordinate values of the path parameter $PP_n$, $PP_{n+1}$ showing a start position and an end position of the path. The movement speed of the nozzle 61 is an average speed of the nozzle

61 in each path, and is pre-assigned to each path in the three-dimensional shaping apparatus 100 according to a level of the shaping speed pre-specified by a user of the three-dimensional shaping system 10. The command addition portion 15 further calculates an angle at which the movement direction of the nozzle 61 changes between the two consecutive paths as the control contents of the nozzle 61.

Figure 9:
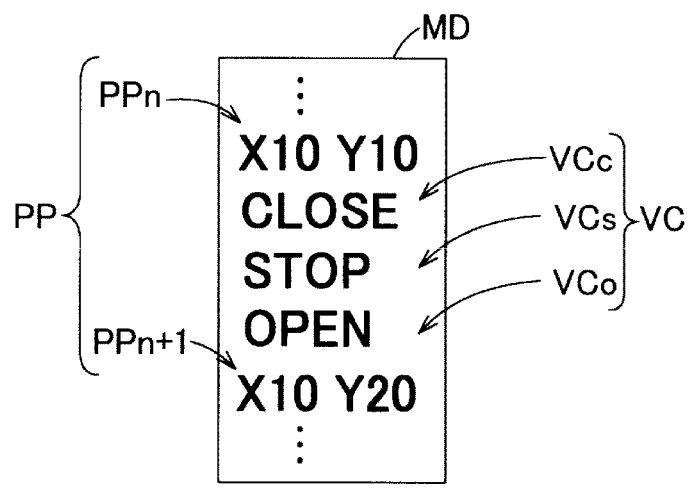
FIG. 9 is a schematic diagram showing an example of shaping data.

FIG. 9 is a schematic diagram showing an example of the shaping data MD generated in a step S30. In the step S30, the command addition portion 15 performs command addition determination processing described later using the analysis result in the step S20. Then, according to a determination result, a stop command VC is added to the path data PD to generate the shaping data MD.

The stop command VC includes a close command VCc, a move stop command VCs, and an open command VCo in this order. The close command VCc represents a command to cause the opening and closing mechanism 70 to close the flow path 65 and to stop the discharge of the shaping material MM from the nozzle 61. The move stop command VCs represents a command to stop the movement of the nozzle 61. The move stop command VCs may include a parameter which represents a stop time. When the parameter representing the stop time is not included, the move stop command VCs represents a command for stopping the movement of the nozzle 61 for a predetermined time. The open command VCo represents a command which causes the opening and closing mechanism 70 to open the flow path 65 and to allow the discharge of the shaping material MM from the nozzle 61.

In a step S40, the shaping data MD generated by the command addition portion 15 is transmitted to the control portion 101 of the three-dimensional shaping apparatus 100. By interpreting the shaping data MD including the stop command VC shown in FIG. 9, the control portion 101 can control the opening and closing mechanism 70 to close the flow path 65 when the movement mechanism 230 does not change the position of the nozzle 61, and control the opening and closing mechanism 70 to open the flow path 65 when the movement mechanism 230 changes the position of the nozzle 61.

Figure 10:
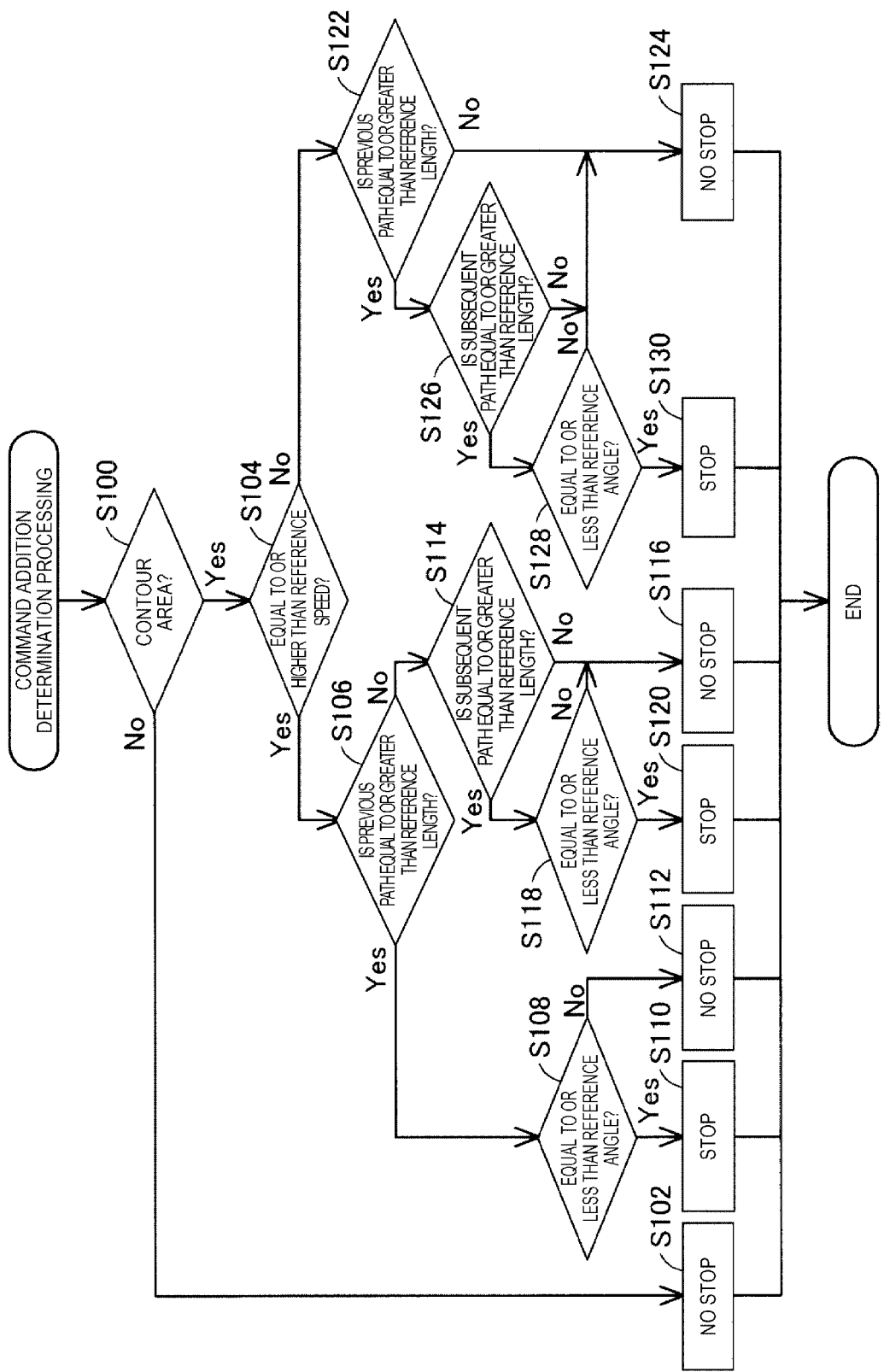
FIG. 10 is a flowchart of command addition determination processing.

FIG. 10 is a flowchart of the command addition determination processing performed by the command addition portion 15. The command addition determination processing is performed for all the two consecutive paths included in the path data PD. By the command addition determination processing, the command addition portion 15 determines whether or not the stop command VC is added between the two consecutive paths. In the following, of the two consecutive paths, the preceding path is called a "previous path", and a path following the previous path is called a "subsequent path". A reference value in each determination processing below is a predetermined value in accordance with various conditions such as a drive characteristic of the opening and closing mechanism 70 such as an opening and closing speed and a response speed of the opening and closing mechanism 70, discharge performance of the nozzle 61, a drive characteristic of the movement mechanism 230, and a characteristic of the shaping material MM.

In a step S100, the command addition portion 15 determines whether or not the previous path and the subsequent path are paths for shaping a contour area of the shaping layer ML. In the present embodiment, the command addition portion 15 determines that the previous path and the subsequent path are paths for shaping the contour area when the previous path and the subsequent path are outermost paths in the current shaping layer ML. When the previous path and the subsequent path are not the paths for shaping the contour area, the command addition portion 15 determines that the stop command VC is not added. On the other hand, when the previous path and the subsequent path are the paths for shaping the contour area, in a step S104, the command addition portion 15 determines whether or not the movement speed of the nozzle 61 in the previous path is equal to or higher than a reference speed. The reference speed is, for example, 20 to 50 mm/sec.

When it is determined that the movement speed of the nozzle 61 in the previous path is equal to or higher than the reference speed, the command addition portion 15 determines whether or not the movement distance of the previous path is equal to or greater than a reference length in a step S106. The reference length is, for example, 20 to 50 mm. When it is determined that the movement distance of the previous path is equal to or greater than the reference length, the command addition portion 15 determines whether or not an angle at which the previous path and the subsequent path are connected is equal to or less than a reference angle in a step S108. The reference angle is 90 degrees in the present embodiment. The reference angle is not limited to 90 degrees, and may be an obtuse angle such as 120 degrees, 135 degrees, and 150 degrees, which exceeds 90 degrees, for example. Further, the reference angle may be an acute angle smaller than 90 degrees.

Figure 11:
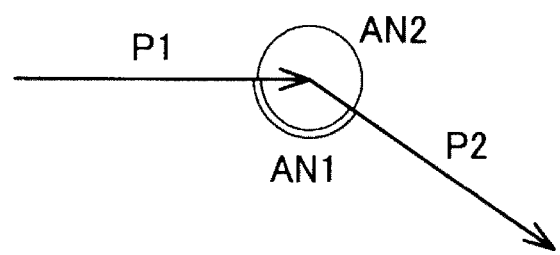
FIG. 11 is a diagram showing an angle at which a previous path and a subsequent path are connected.

FIG. 11 illustrates an angle at which the previous path and the subsequent path are connected. In the present embodiment, a connecting angle at which the previous path P1 and the subsequent path P2 are connected is referred to as a smaller angle AN1 of two angles AN1 and AN2 formed by the connecting of the previous path P1 and the subsequent path P2. That is, the angle at which the previous path P1 and the subsequent path P2 are connected is a corner formed by the previous path and the subsequent path.

When it is determined in the step S108 that the connecting angle between the previous path and the subsequent path is equal to or less than the reference angle, the command addition portion 15 determines that the stop command VC is added in a step S110. On the other hand, when it is determined in the step S108 that the connecting angle between the previous path and the subsequent path exceeds the reference angle, the command addition portion 15 determines that the stop command VC is not added in a step S112.

When it is determined in the step S106 that the movement distance of the previous path is less than the reference length, the command addition portion 15 determines whether or not the movement distance of the subsequent path is equal to or greater than the reference length in a step S114. When it is determined that the movement distance of the subsequent path is less than the reference length, the command addition portion 15 determines that the stop command VC is not added in a step S116.

When it is determined in step S114 that the movement distance of the subsequent path is equal to or greater than the reference length, the command addition portion 15 determines whether or not the connecting angle between the previous path and the subsequent path is equal to or less than the reference angle in a step S118. When it is determined that the connecting angle is equal to or less than the reference angle, the command addition portion 15 determines that the stop command VC is added in a step S120. On the other hand, when it is determined that the connecting angle exceeds the reference angle, the command addition portion 15 determines that the stop command VC is not added in the step S116.

When it is determined in the step S104 that the movement speed of the nozzle 61 in the previous path is less than the reference speed, the command addition portion 15 determines whether or not the movement distance of the previous path is equal to or greater than the reference length in a step S122. When it is determined that the movement distance of the previous path is less than the reference length, the command addition portion 15 determines that the stop command VC is not added in a step S124.

When it is determined in the step S122 that the movement distance of the previous path is equal to or greater than the reference length, the command addition portion 15 determines whether or not the movement distance of the subsequent path is equal to or greater than the reference length in a step S126. When it is determined that the movement distance of the subsequent path is less than the reference length, the command addition portion 15 determines that the stop command VC is not added in the step S124.

When it is determined in the step S126 that the movement distance of the subsequent path is equal to or greater than the reference length, the command addition portion 15 determines whether or not the connecting angle between the previous path and the subsequent path is equal to or less than the reference angle in a step S128. When it is determined that the connecting angle between the previous path and the subsequent path is equal to or less than the reference angle, the command addition portion 15 determines that the stop command VC is added in a step S130. On the other hand, when it is determined that the connecting angle between the previous path and the subsequent path is less than the reference angle, the command addition portion 15 determines that the stop command VC is not added in the step S124.

Figure 12:
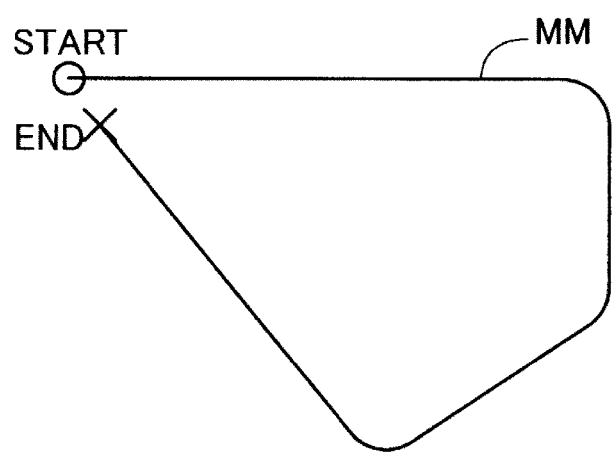
FIG. 12 is a diagram showing a comparative example in which a shaping material is bent and disposed.

According to the three-dimensional shaping system 10 of the present embodiment described above, when the length of each of two consecutive paths, the connecting angle between the two paths, the movement speed of the nozzle 61, or the like satisfies the predetermined conditions, the stop command VC is added to the path data PD, so that the movement of the nozzle 61 and the discharge of the shaping material MM are stopped when the two paths switch. Therefore, the shaping material MM is not excessively discharged at the shaping location at which the movement mode of the nozzle 61 switches. Further, when consecutive paths is generated without stopping the nozzle 61, the nozzle 61 is decelerated near an end point of the previous path and is moved to the subsequent path while accelerating, so that there is a concern that the shaping material MM is bent and disposed as in the comparative example shown in FIG. 12. On the other hand, in the present embodiment, since the movement of the nozzle 61 is temporarily stopped at the shaping location at which the two paths switch so as to satisfy the predetermined condition, a corner portion of the three-dimensional shaping object is shaped with high precision. Therefore, according to the present embodiment, it is possible to improve shaping precision of the three-dimensional shaping object.

Further, in the present embodiment, the command addition portion 15 adds the stop command VC only to the path data for shaping the contour area of the shaping layer ML. Therefore, since the stop command VC is not added to path data for shaping an internal area which does not affect appearance of the three-dimensional shaping object, it is possible to discharge the shaping material MM to the internal area at high speed. Therefore, it is possible to shape the three-dimensional shaping object with high precision and at high speed.

Further, according to the present embodiment, from the path data PD in which the movement of the nozzle 61 and the discharge of the shaping material MM from the nozzle 61 are described, the shaping data MD suitable to the three-dimensional shaping apparatus 100 having the opening and closing mechanism 70 is generated automatically. Therefore, for example, even when the three-dimensional shaping apparatus 100 is modified from a configuration without the opening and closing mechanism 70 to a configuration with the opening and closing mechanism 70, modification work of the shaping data MD is facilitated. In particular, according to the three-dimensional shaping system 10 of the present embodiment, since the path data PD can be created using software for the 3D printer with the FDM method in related art, the shaping data MD can be created efficiently.

According to the three-dimensional shaping system 10 of the present embodiment, the control apparatus 11 has the path data generation portion 12. Therefore, if the original data OD such as three-dimensional CAD data is input to the control apparatus 11, the shaping data MD is generated in the control apparatus 11, and the three-dimensional shaping apparatus 100 can shape the three-dimensional shaping object. Therefore, after the three-dimensional CAD data is generated, processing to shape the three-dimensional shaping object is simplified.

B. Other Embodiments (B-1) In the embodiment described above, the stop command VC includes the close command VCc, the move stop command VCs, and the open command VCo. On the other hand, the stop command VC may include only the move stop command VCs. In this case, the control portion 101 of the three-dimensional shaping apparatus 100 temporarily stops the movement of the nozzle 61 as operation corresponding to the stop command VC, and controls the opening and closing mechanism 70 to close the flow path 65 while the movement of the nozzle 61 is stopped. Then, as operation corresponding to the path data PD, the nozzle 61 is moved while the flow path 65 is open. By doing in this manner, it is possible to reduce data amount of the shaping data MD.

(B-2) In the embodiment described above, the command addition portion 15 adds the stop command VC only to the path data for shaping the contour area of the shaping layer ML. On the other hand, the command addition portion 15 may also add the stop command VC to the path data for shaping the internal area of the shaping layer ML. In addition, the command addition portion 15 may not add the stop command when the path data is path data for shaping an area previously specified by the user. In such an aspect, the user can arbitrarily set the area to which the stop command is not added. Therefore, an area targeted for determining whether or not the stop command is added can be, for example, an area outside the three-dimensional shaping object such as the upper surface and the lower surface of the three-dimensional shaping object, and an area other than the contour of the three-dimensional shaping object such as areas of several layers inside the three-dimensional shaping object.

(B-3) In the embodiment described above, the three-dimensional shaping apparatus 100 may separately include the shaping portion 110 for discharging a support material as the shaping material. In this case, the command addition portion 15 may not add the stop command VC even to an area for discharging the support material to support the three-dimensional shaping object. By doing in this manner, it is possible to rapidly shape the support area for supporting the three-dimensional shaping object.

(B-4) In the embodiment described above, the command addition portion 15 considers all of the movement speed of the nozzle 61, the length of the previous path and the subsequent path, and the connecting angle between the previous path and the subsequent path, and determines whether or not the stop command VC is added to the path data PD, based on the flowchart shown in FIG. 10. On the other hand, the command addition portion 15 may determine whether or not the stop command VC is added to the path data PD based on a simpler condition. For example, the command addition portion 15 may add the stop command VC regardless of the connecting angle between the paths and the movement speed of the nozzle 61 when the movement distance of the previous path is equal to or greater than the reference length. By doing in this manner, for example, it is possible to increase shaping precision of the shaping location at which the movement distance of the nozzle 61 greatly changes. Further, the command addition portion 15 may add the stop command VC regardless of the movement speed of the nozzle 61 and the length of the path when the connecting angle between the previous path and the subsequent path is equal to or less than the reference angle. By doing in this manner, for example, it is possible to increase the shaping precision of the shaping location at which the angle between the two paths greatly changes. Further, command addition portion 15 may add the stop command VC regardless of the movement speed of the nozzle 61 when the connecting angle between the previous path and subsequent path is equal to or less than the reference angle and the movement distance of the previous path is equal to or greater than the reference length. By doing in this manner, for example, it is possible to increase the shaping precision of the shaping location at which the angle between the two paths greatly changes and the movement distance of the nozzle 61 greatly changes.

(B-5) In the three-dimensional shaping system 10, the path data generation portion 12 may be constituted with a computer separate from the control apparatus 11, or may be constituted with a single apparatus separate from the control apparatus 11. Further, in the three-dimensional shaping system 10, the path data generation portion 12 of the control apparatus 11 may be omitted, and a configuration may be adopted in which the shaping data MD is generated in the shaping data generation portion 13 of the control apparatus 11 based on the path data PD generated outside the system.

(B-6) The path data PD may not be the same type of data as the data used in the 3D printer with the FDM method, and may not be data which can be created by the slicer which is software in related art. The path data PD may include a parameter and a command other than the path data PD and the discharge parameter PM.

(B-7) The three-dimensional shaping apparatus 100 is not limited to one which plasticizes the material by the flat screw 40. For example, the three-dimensional shaping apparatus 100 may be one which plasticizes the material by rotating an in-line screw instead of the flat screw 40. Further, the three-dimensional shaping apparatus 100 may be one which does not have the shaping material generation portion 30 and which receives supply of the shaping material plasticized by another apparatus and discharges the shaping material from the nozzle 61.

(B-8) The opening and closing mechanism 70 of the three-dimensional shaping apparatus 100 may be constituted with a shutter moving so as to cross a flowing direction of the shaping material MM in the flow path 65. Further, the opening and closing mechanism 70 may be constituted with a plunger which protrudes into the flow path 65 to close the flow path 65. The opening and closing mechanism 70 may be constituted by combining two or more mechanisms among the butterfly valve described in the embodiment above, a shutter mechanism using the shutter, and the plunger.

(B-9) In the embodiment described above, addition of the stop command VC is performed for a path inside the shaping layer ML. That is, it is assumed that the previous path and the subsequent path are paths on the X, Y plane. On the other hand, the previous path and the subsequent path may be paths in three-dimensional space. That is, in the three-dimensional space, when at least one of the length of the two consecutive paths and the connecting angle satisfies a predetermined condition, the stop command VC may be added to temporarily stop the movement of the nozzle 61 and to temporarily stop the discharge of the shaping material MM from the nozzle 61.

C. Other Aspects

The present disclosure is not limited to each of the embodiments described above, and can be realized with various aspects in the range without departing from the gist thereof. For example, the present disclosure can be implemented as the following aspects. The technical features in each of the embodiments described above corresponding to the technical features in each of aspects described below may be replaced or combined as appropriate in order to solve part or all of the problems which the present disclosure includes or to accomplish part of all of the effects which the present disclosure achieves. In addition, unless the technical feature is described as essential in the present disclosure, the technical feature can be deleted as appropriate.

(1) According to a first aspect of the present disclosure, there is provided a three-dimensional shaping system including a three-dimensional shaping apparatus and a control apparatus. The three-dimensional shaping apparatus includes a shaping table, a nozzle discharging a shaping material toward the shaping table, an opening and closing mechanism opening and closing a flow path of the shaping material connected to the nozzle, a movement mechanism changing a relative position between the shaping table and the nozzle, and a control portion controlling the opening and closing mechanism to close the flow path when the movement mechanism does not change the relative position and controlling the opening and closing mechanism to open the flow path when the movement mechanism changes the relative position. The control apparatus includes a shaping data generation portion which analyzes path data including a plurality of paths indicating a route along which the nozzle moves relative to the shaping table, generates shaping data by adding a stop command to the path data in order to temporarily stop change of the relative position and temporarily close the opening and closing mechanism at the time of switching two consecutive paths, when a length of the two consecutive paths or an angle at which the two consecutive paths are connected satisfies a predetermined condition, and transmits the shaping data to the three-dimensional shaping apparatus. The control portion of the three-dimensional shaping apparatus controls the opening and closing mechanism and the movement mechanism according to the shaping data to shape a three-dimensional shaping object.

In such a three-dimensional shaping system of the aspect, since a stop command is added when a length of two consecutive paths or the angle at which the two consecutive paths are connected satisfies a predetermined condition, movement of the nozzle and discharging of the shaping material are stopped when the two paths switch. Therefore, shaping precision of a shaping location at which an aspect of movement of the nozzle switches can be improved.

(2) In the three-dimensional shaping system of the aspect, the shaping data generation portion may add the stop command when the angle is equal to or less than a predetermined reference angle. In such a three-dimensional shaping system of the aspect, shaping precision of a shaping location at which an angle between two paths greatly changes can be increased, for example.

(3) In the three-dimensional shaping system of the aspect, the shaping data generation portion may add the stop command when a length of a previous path of the two paths is equal to or greater than a predetermined reference length. In such a three-dimensional shaping system of the aspect, shaping precision of a shaping location at which a movement distance of the nozzle greatly changes can be increased, for example.

(4) In the three-dimensional shaping system according to the aspect, the shaping data generation portion may add the stop command when a length of a previous path of the two paths is equal to or greater than a predetermined reference length and when the angle is equal to or less than a predetermined reference angle. In such a three-dimensional shaping system of the aspect, shaping precision of a shaping location at which an angle between two paths greatly changes and a movement distance of the nozzle greatly changes can be increased, for example.

(5) In the three-dimensional shaping system of the aspect, the shaping data generation portion may add the stop command to the path data when a movement speed of the nozzle in a previous path of the two paths, in addition to the length of the two consecutive paths or the angle at which the two consecutive paths are connected, satisfies a predetermined condition. In such a three-dimensional shaping system, in addition to the length of two consecutive paths and the angle at which the two consecutive paths are connected, it can be determined whether or not the stop command is added depending on the movement speed of the nozzle.

(6) In the three-dimensional shaping system of the aspect, the shaping data generation portion may not add the stop command when the path data is path data for shaping a pre-specified area. In such a three-dimensional shaping system, an area to which the stop command is not added can be set arbitrarily.

(7) In the three-dimensional shaping system of the aspect, the shaping data generation portion may not add the stop command when the path data is path data for shaping an area other than contour of the three-dimensional shaping object. In such a three-dimensional shaping system, shaping speed can be improved because the stop command is not added to an area unrelated to an appearance of the three-dimensional shaping object.

(8) In the three-dimensional shaping system of the aspect, the three-dimensional shaping apparatus may further include a shaping material generation portion which includes a flat screw, generates the shaping material by melting at least a portion of a material by the rotating flat screw, and guides the shaping material to the nozzle. In such a three-dimensional shaping system of the aspect, the three-dimensional shaping apparatus can be miniaturized.

(9) According to a second aspect of the present disclosure, a data generation apparatus generating shaping data to be used by a three-dimensional shaping apparatus is provided, the three-dimensional shaping apparatus including a shaping table, a nozzle discharging a shaping material toward the shaping table, an opening and closing mechanism opening and closing a flow path of the shaping material connected to the nozzle, a movement mechanism changing a relative position between the shaping table and the nozzle, and a control portion controlling the opening and closing mechanism to close the flow path when the movement mechanism does not change the relative position and controlling the opening and closing mechanism to open the flow path when the movement mechanism changes the relative position. The data generation apparatus includes a path data acquisition portion acquiring path data including a plurality of paths indicating a route along which the nozzle moves relative to the shaping table, and a shaping data generation portion which analyzes the path data and generates the shaping data for the control portion of the three-dimensional shaping apparatus to control the opening and closing mechanism and the movement mechanism by adding a stop command to the path data in order to temporarily stop change of the relative position and temporarily close the opening and closing mechanism at the time of switching two consecutive paths, when a length of the two consecutive paths or an angle at which the two consecutive paths are connected satisfies a predetermined condition.

In such a data generation apparatus, since a stop command is added when a length of two consecutive paths or the angle at which the two consecutive paths are connected satisfies a predetermined condition, movement of the nozzle and discharging of the shaping material are stopped when the two paths switch in the three-dimensional shaping apparatus. Therefore, shaping precision of a shaping location at which an aspect of movement of the nozzle switches can be improved.

The present disclosure is not limited to the three-dimensional shaping system and data generation apparatus described above, and can be realized in various forms. For example, it can be realized in the form of a method of manufacturing a three-dimensional shaping object, a data generation method, shaping data for shaping the three-dimensional shaping object, a computer program for shaping the three-dimensional shaping object, a non-transitory recording medium which records the shaping data or the computer program, or the like.

What is claimed is:

1. A three-dimensional shaping system comprising:
   a shaping table;
   a nozzle discharging a shaping material toward the shaping table;
   an opening and closing mechanism having an open state and a closed state that opens and closes a flow path of the shaping material connected to the nozzle, nozzle, respectively;
   a movement mechanism changing a relative position between the shaping table and the nozzle;
   a memory configured to store a program, path data, and a stop command, the path data including a plurality of linear paths indicating a route along which the nozzle moves relative to the shaping table, the stop command temporarily stopping a change of the relative position and temporarily maintaining the opening and closing mechanism in the closed state; and
   a processor configured to execute the program so as to:
      maintain the opening and closing mechanism in the closed state when the movement mechanism does not change the relative position;
      maintain the opening and closing mechanism in the open state when the movement mechanism changes the relative position;

determine whether a first length of a first linear path of the plurality of linear paths is equal to or more than a predetermined length, the first linear path corresponding to first data of the path data;

determine whether a second length of a second linear path of the plurality of linear paths is equal to or more than the predetermined length, the second linear path being subsequent to the first linear path, the second linear path corresponding to second data of the path data;

determine whether an angle between the first linear path and the second linear path is equal to or less than a predetermined angle;

add the stop command between the first data and the second data to create modified path data when the first length is equal to or more than the predetermined length and the angle is equal to or less than the predetermined angle;

add the stop command between the first data and the second data to create the modified path data when the first length is less than the predetermined length, the second length is equal to or more than the predetermined length, and the angle is equal to or less than the predetermined angle; and cause the nozzle to discharge the shaping material toward the shaping table according to the modified path data.

2. The three-dimensional shaping system according to claim 1, wherein the processor is further configured to:
determine whether a movement speed of the nozzle relative to the shaping table is equal to or more than a predetermined movement speed;

add the stop command between the first data and the second data to create the modified path data when the movement speed is equal to or more than the predetermined movement speed, the first length is equal to or more than the predetermined length, and the angle is equal to or less than the predetermined angle; and cause the nozzle to discharge the shaping material toward the shaping table according to the modified path data.

3. The three-dimensional shaping system according to claim 1, wherein the processor is further configured to:
determine whether the path data is for shaping a predetermined area;
not add the stop command in the path data; and
cause the nozzle to discharge the shaping material toward the shaping table according to the path data.

4. The three-dimensional shaping system according to claim 1, wherein the processor is further configured to:
determine whether the path data is for shaping an area other than contour of the three-dimensional shaping object;
not add the stop command in the path data; and
cause the nozzle to discharge the shaping material toward the shaping table according to the path data.

5. The three-dimensional shaping system according to claim 1, further comprising:

a flat screw configured to generate the shaping material by rotating the flat screw and by melting a portion of a source material; and a material flow path configured to guide the melted shaping material from the flat screw to the nozzle.

6. A data generation apparatus generating shaping data to be used by a three-dimensional shaping apparatus, the three-dimensional shaping apparatus including:

a shaping table;
a nozzle discharging a shaping material toward the shaping table:
an opening and closing mechanism having an open state and a closed state that opens and closes a flow path of the shaping material connected to the nozzle, respectively; and a movement mechanism changing a relative position between the shaping table and the nozzle, the opening and closing mechanism maintaining the closed state when the movement mechanism does not change the relative position, the opening and closing mechanism maintaining the open state when the movement mechanism changes the relative position, the data generation apparatus comprising:
a memory configured to store a program and a stop command, the stop command temporarily stopping a change of the relative position and temporarily maintaining the opening and closing mechanism in the close state; and a processor configured to execute the program so as to:
acquire path data, the path data including a plurality of linear paths indicating a route along which the nozzle moves relative to the shaping table;

determine whether a first length of a first linear path of the plurality of linear paths is equal to or more than a predetermined length, the first linear path corresponding to first data of the path data;

determine whether a second length of a second linear path of the plurality of linear paths is equal to or more than the predetermined length, the second linear path being subsequent to the first linear path, the second linear path corresponding to second data of the path data;

determine whether an angle between the first linear path and the second linear path is equal to or less than a predetermined angle;

add the stop command between the first data and the second data to create modified path data when the first length is equal to or more than the predetermined length and the angle is equal to or less than the predetermined angle; and add the stop command between the first data and the second data to create the modified path data when the first length is less than the predetermined length, the second length is equal to or more than the predetermined length, and the angle is equal to or less than the predetermined angle, wherein the nozzle of the three-dimensional shaping apparatus discharges the shaping material toward the shaping table according to the modified path data.

* * * * *